(12) United States Patent
Brettell

(10) Patent No.: US 7,748,718 B2
(45) Date of Patent: Jul. 6, 2010

(54) EXPANABLE MANDREL

(75) Inventor: Charles E. Brettell, North Pomfret, VT (US)

(73) Assignee: The Gleason Works, Rochester, NY (US)

( * ) Notice: Subject to any disclaimer, the term of this patent is extended or adjusted under 35 U.S.C. 154(b) by 1055 days.

(21) Appl. No.: 11/424,583

(22) Filed: Jun. 16, 2006

(65) Prior Publication Data
US 2006/0284383 A1 Dec. 21, 2006

Related U.S. Application Data

(60) Provisional application No. 60/692,203, filed on Jun. 20, 2005.

(51) Int. Cl.
*B23B 31/40* (2006.01)
(52) U.S. Cl. .................. 279/2.13; 82/169; 269/48.1
(58) Field of Classification Search .................. 279/2.1, 279/2.11, 2.13; 82/168, 169; 242/573.1, 242/573.9; 269/2, 48.1, 48.2, 48.3; *B23B 31/40*; *B23Q 3/14*
See application file for complete search history.

(56) References Cited

U.S. PATENT DOCUMENTS

| | | | | |
|---|---|---|---|---|
| 55,681 A | | 6/1866 | Le Count | |
| 153,347 A | * | 7/1874 | King | 82/169 |
| 180,169 A | * | 7/1876 | Tasker | 279/2.13 |
| 198,633 A | | 12/1877 | Le Count | |
| 291,282 A | * | 1/1884 | Blue | 279/2.12 |
| 677,009 A | * | 6/1901 | White | 82/169 |
| 1,186,429 A | * | 6/1916 | Nicholson | 82/169 |
| 1,428,035 A | * | 9/1922 | Jarmolowsky | 279/2.1 |
| 1,654,737 A | * | 1/1928 | Kistner | 82/169 |
| 2,518,508 A | * | 8/1950 | Bever | 82/169 |
| 2,526,772 A | * | 10/1950 | Reynolds | 82/169 |
| 2,544,633 A | | 3/1951 | Le Count | |

FOREIGN PATENT DOCUMENTS

EP 0552414 B1 7/1993

* cited by examiner

*Primary Examiner*—Eric A Gates
(74) *Attorney, Agent, or Firm*—Robert L. McDowell

(57) ABSTRACT

An expandable mandrel for holding a part has a shank with inclined radial slots slidably engaged by keys. The keys are coordinated by a collar which engages an extension on each key. A platen affixes to the shank of the mandrel to provide a stop that will index the position of a part mounted onto the mandrel. The platen has radial key passages to allow longitudinal movement of the keys in the slots. The platen preferably has resilient indexing nubs to engage the part. Preferably, the position of the platen on the mandrel can be adjusted by a set screw engaging one of several indexing holes or engaging a longitudinal guide track. For machining in a wet environment, the slots can be provided with longitudinal rails and the keys provided with transverse channels to remove liquid from between the keys and the slots.

11 Claims, 3 Drawing Sheets

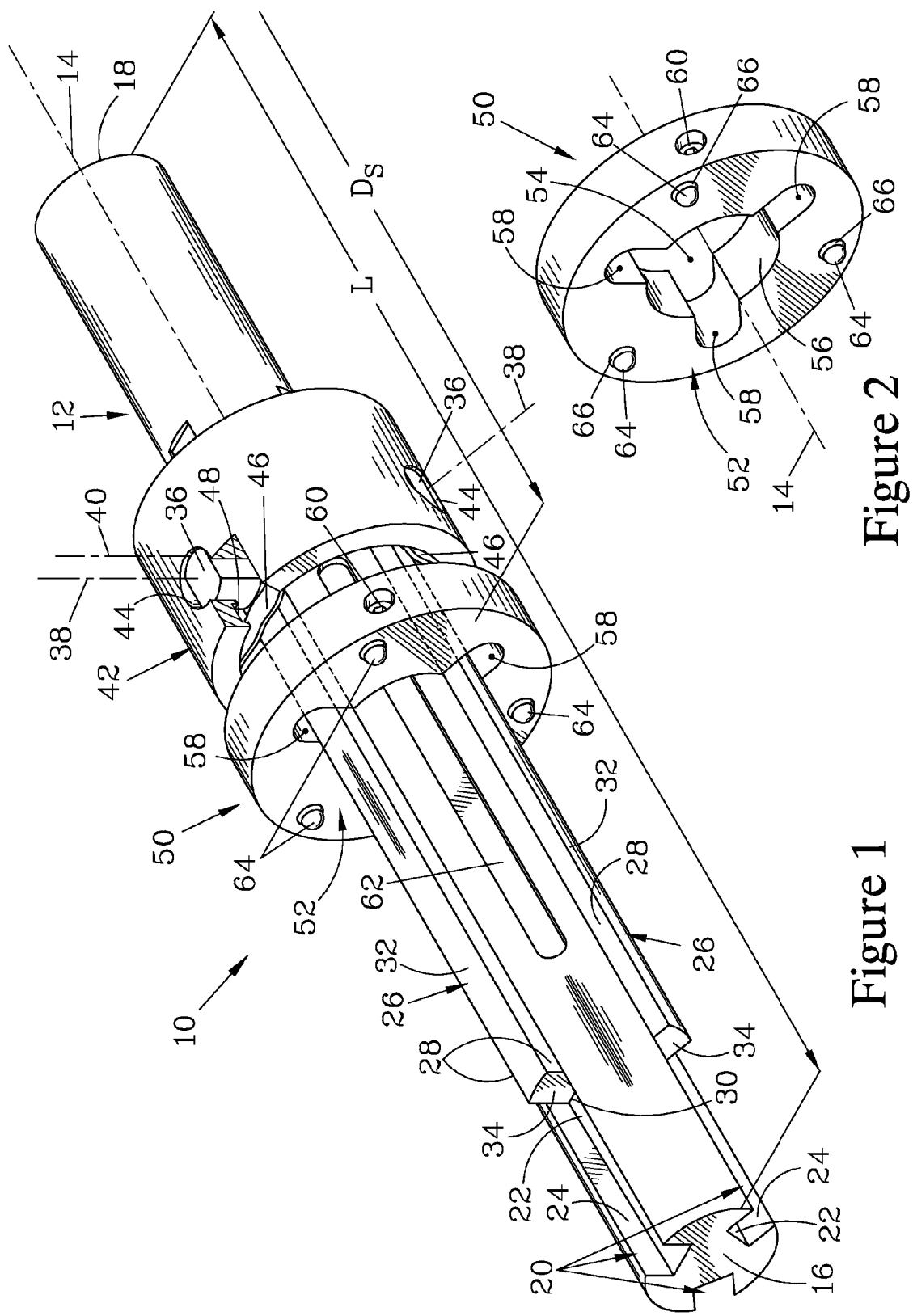

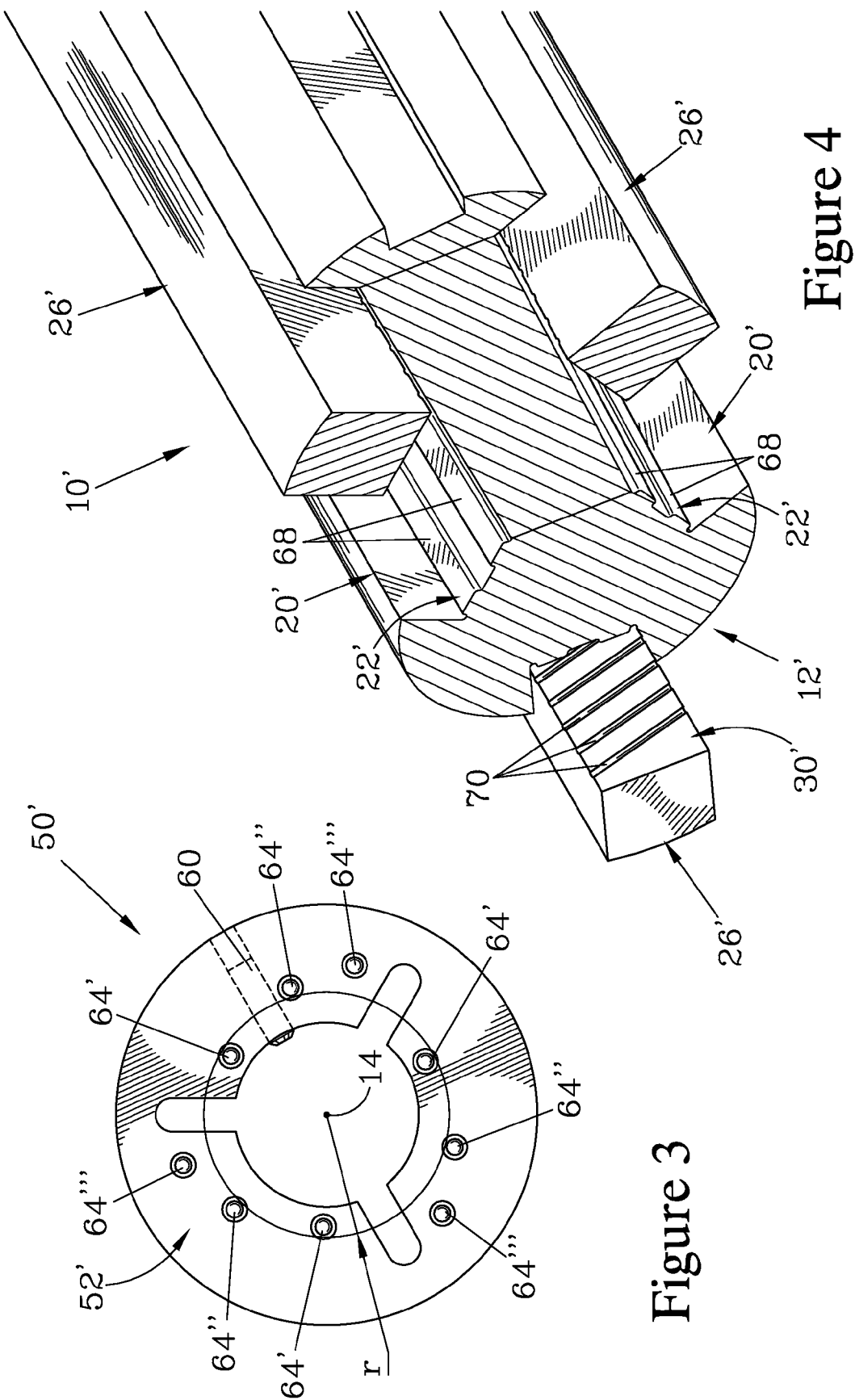

EXPANABLE MANDREL

FIELD OF THE INVENTION

The present invention relates to expandable mandrels for temporarily mounting a part, and particularly to an expandable mandrel which provides consistent location of the part along the length of the mandrel.

BACKGROUND OF THE INVENTION

Expandable mandrels have been used for applications where parts must be quickly mounted onto and subsequently removed from a mandrel, the part having a generally cylindrical mounting hole for mounting to a shaft for rotating the part. Two classic applications are part inspection, where the part is mounted to the mandrel to allow measurement of its concentricity or other dimensions, and part fabrication, where a blank is mounted to the mandrel to allow it to be machined to fabricate the part such as by grinding, turning, and/or other manufacturing operations. In either case, there is a need for the part to be quickly mounted so as to be concentric with the mandrel.

Over the years, several expandable designs for mandrels have been employed. Classically, such expandable mandrels employ a shank having longitudinal slots that are slidably engaged by a number of keys. The slots are sloped relative to a longitudinal axis of the shank, and the keys have bottom surfaces which are similarly sloped such that, as the keys slide in the slots, their separation from the shank axis either increases or decreases. A sleeve movably engages the shank and the keys and serves to force the keys to slide along their respective slots in a coordinated manner. When a part is to be mounted to the mandrel, the mounting hole of the part is placed about a portion of the keys and the sleeve is moved to force the keys outwards to grip the part. One early patent, U.S. Pat. No. 198,633, teaches a sleeve which slidably engages the shank, allowing more rapid mounting and dismounting of parts than is possible with earlier expanding mandrels, where the sleeve is threadably engaged with the shank. Sliding sleeves are employed in most modern expanding mandrels.

While employing the same basic scheme for securing a part to the shank, expanding mandrels differ in details of their structure. The shanks have distal ends that may be either cylindrical or frusto-conical, in the latter case tapering as the distal end is approached. Similarly, the designs may differ in the configuration of tension springs employed to maintain the keys slidably engaged in their respective slots and in the structure for engaging the sleeve with the keys so as to coordinate the longitudinal motion of the keys.

U.S. Pat. No. 2,544,633 teaches a mandrel that employs a sleeve having radially-extending passages that slidably engage protrusions on each of the keys to control the longitudinal position of the keys. The mandrel of this patent also employs a tension spring that surrounds the keys to hold them in their slots, the tension spring engaging the keys at a location between the sleeve and the distal end of the shank.

While existing expanding mandrels allow parts to be mounted and removed readily while providing accurate concentricity with the mandrel shank, in all the above designs the part may vary in its axial position when mounted. This variation in the axial position frequently requires an operator to adjust the axial position of the mandrel to assure that the part is in a desired location for inspection or machining. To avoid this additional step, there is a need for an expandable mandrel which can quickly secure a part at a desired axial location along the length of the mandrel.

SUMMARY OF THE INVENTION

The present invention is for an improvement for expandable mandrels that are typically used for holding a workpiece, having a central passage passing therethrough or terminating therein, so that the workpiece can be readily gripped for grinding, turning, or other manufacturing operations. The expanding mandrels for which the present invention is designed also have utility in gripping previously fabricated parts for inspection purposes. For convenience, the piece to be mounted to the mandrel is hereafter referred to as a "part", regardless of whether the piece is to be machined or merely inspected.

The mandrels for which the present improvement is intended have a shank extending along a longitudinal central shank axis. The shank, having a shank length L, terminates in a shank distal end and a shank proximal end. The shank has a plurality of radial slots extending along a portion of the shank length. At least three slots should be provided, and for most applications it is preferred to provide no more than three. The slots are each bounded by a slot bottom surface and a pair of spaced-apart parallel slot sidewalls. The slots initiate in a spaced-apart relationship from the proximal end and extend toward the distal end. Preferably, the slots either pass through or terminate in close proximity to the distal end.

The slot bottom surface for each of the slots is inclined with respect to the shank axis such that the bottom surfaces converge as the shank is traversed. If the mandrel is to be used in passages which terminate within the part (blind holes), then it is typically preferred for the convergence to occur when the path is traversed in the direction of the proximal end, while if the mounting passage extends through the part, it is typically preferred to have the bottom surfaces converge as they approach the distal end.

A plurality of keys (frequently referred to in the industry as "jaws") is provided, each of the keys being slidably engaged with one of the longitudinal slots. The keys each terminate in a proximal approaching end and a distal approaching end. Each of the keys has a key bottom surface and a pair of spaced-apart key sidewalls that are configured so that they will slidably engage the pair of spaced-apart slot sidewalls. The key bottom surface is also configured such that it can slidably engage the slot bottom surface.

The keys also each have a key upper surface which is configured so as to have one portion which is generated by one or more line segments which extend parallel to the shank axis when the key is slidably engaged with one of the slots in a manner such that the key bottom surface is slidably engaged with the slot bottom surface.

Each of the keys is provided with an extension; the extension frequently protrudes from the key upper surface. The extension is positioned such that it is substantially spaced apart from the distal approaching end of the key. For the extension described above, the extension has an extension sidewall that can be generated by a line which is moved about an extension axis of the key while remaining parallel thereto, the extension axis being both normal to and intersecting the shank axis when the key is slidably engaged in one of the slots in the shank.

A collar is also provided as part of the mandrel, and is configured to slidably engage the shank. The collar serves to limit longitudinal movement of the keys and assure that the keys move in a coordinated manner, thereby assuring concentricity of the part relative to the shank when gripped by the keys. When the keys are provided with extensions which protrude from the key upper surfaces, the collar preferably extends over a portion of the keys and has a series of extension passages, each of which is configured and positioned to slidably engage the extension sidewall of one of the keys when the keys are engaged in the radial slots. A collar as described above also serves to help maintain the keys in the slots.

Some expansion mandrels which employ alternate collar and key configurations are suitable for the improvements of the present invention. One example of such a collar and key combination employs a collar that does not extend over a portion of the keys, but rather resides between a portion of the keys and the shank; this embodiment employs keys that have extensions that extend downward and engage passages in the collar, which again serve to limit longitudinal movement and assure that the keys move in a coordinated manner to assure concentricity of the part on the shank.

One or more springs are provided to maintain the keys radially engaged with the radial slots, and means for maintaining the one or more springs at a set separation from the extensions is provided. For collars which do not extend over a portion of the keys, multiple springs may be required.

The improvement of the present invention, broadly speaking, provides a platen attachable to the shank of the mandrel so as to provide a stop that will index where a part mounted onto the mandrel resides along the length L of the mandrel, thereby reducing the set-up time from part to part. The platen is fixably positionable about the shank. The platen also has a part-engaging surface against which a control surface of the part is indexed. The platen is provided with key passages that extend radially about the shank axis when the platen resides on the shank and are of a size sufficient to allow free movement of the keys in the slots.

The platen serves as a part stop in the following manner. When the part is moved toward the proximal end of the shank, the control surface of the part is brought into referential contact with the part-engaging surface and further movement toward the proximal end is blocked. If such contact is by direct contact, it is critical that the relationship of the part-engaging surface to the longitudinal central shank axis of the shank reflect the relationship of the control surface of the part with respect to the central axis of the part. Failure to maintain these relationships can result in misalignment of the part with respect to the shank axis.

To reduce the criticality of the match between the part-engaging surface of the platen and the part control surface, it is preferred for resiliently-mounted indexing nubs to be provided on the part-engaging surface of the platen. This allows referencing with respect to the surfaces while not requiring exact matching of the surfaces. Resilient mounting of the indexing nubs is also felt to be beneficial in providing some give to accommodate the impact on the shank typically used to lock the keys against the mounting passage of the part, allowing the part to remain at the desired location when the shank is impacted.

When the mandrel is dedicated to a particular application, such that the desired location of the part along the length of the mandrel remains constant, the platen can be permanently affixed to the shank, or can be secured in position by a set screw passing into an indexing hole. However, to increase the flexibility of the mandrel, it is generally preferred for the platen to be affixable to the shank in an adjustable manner. If such is to be done, then there must be means for allowing the translation of the platen along the shank axis, as well as means for affixing the platen longitudinally with respect to the shank and means for limiting any rotation of the platen about the shank axis to a degree that will assure there will be no interference between the keys and the key passages in the platen. When the shank has a uniform cross section over the portion of its length extending to the distal end, means for allowing translation of the platen along the shank can be provided by a platen central passage sized to slidably engage the shank.

One preferred means for affixing the platen longitudinally along the shank is to provide a platen set screw threadably mounted in the platen and positioned such that, when tightened, the platen set screw fixably engages the shank. To provide positive longitudinal positioning of the platen as well as radial positioning of the platen, it is preferred for the shank to be provided with a series of indexing holes configured to accept the set screw. When greater flexibility in the longitudinal position is desired while still maintaining limited rotation as the platen traverses the shank, a preferred way to limit the rotation of the platen to an acceptable degree is to provide a longitudinal platen guide track having a track width which is somewhat wider than the set screw, but which is still sufficiently narrow as to limit rotation of the platen to a satisfactory degree when the set screw is engaged in the platen guide track. While such provides greater flexibility in the longitudinal position of the platen compared with the use of a series of indexing holes, the positioning is somewhat less secure. The benefits of positive affixing of the platen and limiting the rotation as the longitudinal position of the platen is adjusted can be provided by employing a longitudinal track in combination with a series of index holes, so that the platen set screw can be withdrawn from one of the indexing holes, but still extend into the platen central passage sufficiently to engage the longitudinal guide track to limit rotation as the platen is moved along the shank to align the platen set screw with a different indexing hole.

It will be appreciated that there are other structures that could be employed to limit the longitudinal position of the platen. Since the mandrels will have a collar which, for a particular part, will reside at essentially the same position on the shank for each part, one could construct a mechanism for slidably engaging the platen to the collar such that the platen tracks the central axis of the shank. Similarly, there are other options which could be employed to guide the platen such that translation along the axis would be essentially linear with very limited rotational freedom as the platen traverses the shank. For example, the shape of the shank could be made hexagonal and a hexagonal passage could be provided in the platen.

The flexibility of the platen for positioning parts can also be enhanced by providing multiple sets of indexing nubs on the part-engaging surface, mounted at varying radial distances, so as to accommodate a wider range of part shapes.

For applications where the mandrel is used for machining in a wet environment for such operations as grinding, turning, and milling, it is further preferred that the character of the bottom surface of the radial slots be modified, as well as the character of the bottom surface of the keys. In this embodiment, it is preferred that the bottom surfaces of the slots be fitted with a pair of rails running along the surface so as to create longitudinal tracks. This is done in combination with transverse channels in the bottom surface of the keys, this combination serving to remove liquid from between the key bottom surfaces and the slot bottom surfaces when the keys are slid to secure against the mounting hole of the part. It should be appreciated that this latter improvement has utility even if a platen is not employed.

BRIEF DESCRIPTION OF THE FIGURES

FIG. 1 is an isometric view of one embodiment of an improved expandable mandrel of the present invention, the mandrel having a shank with three radial slots that are slidably engaged by keys. The improvement is provided by a platen which, in this embodiment, slidably engages the shank of the mandrel and tracks a central axis of the shank. In FIG. 1, the expandable mandrel and the platen are viewed looking toward a part-engaging surface of the platen. A platen set screw is provided in the platen and engages a longitudinal platen guide track in the shank to assure that the movement of the platen relative to the shank will be substantially limited to translational motion along the shank axis. The platen set screw, when tightened in the platen guide track so that it forcibly engages the bottom of the platen guide track, serves as means for affixing the platen with respect to the shank.

FIG. 2 is an isometric view of the platen shown in FIG. 1 when removed from the shank to show the complete view of the part reference surface of the platen. As illustrated, a set of three indexing nubs is provided and positioned such that the indexing nubs are symmetrically disposed about the central axis of the shank and are at a constant radial separation therefrom. The indexing nubs slidably engage and are supported in sets which are countersunk into the part-engaging surface of the platen. Springs are provided in the sets which resiliently support the indexing nubs so that they are resiliently mounted with respect to the part-engaging surface. The indexing nubs provide for flexible referencing of the part with respect to the platen.

FIG. 3 is a view of an alternative platen which provides greater flexibility in the shapes of parts which can be indexed than the platen shown in FIGS. 1 and 2. The platen shown in FIG. 3 has three series of indexing nubs at differing radii from the shank axis to allow indexing for a wider variety of parts.

FIG. 4 is a partial section view of a mandrel similar to that shown in FIG. 1, with part of the shank and two of the keys being broken out so as to reveal details of the structure of the radial slots and the keys of this embodiment. The contours of the surfaces of the slots and the keys have additional features which enhance the performance of the mandrel when operating under wet conditions. The improvement in the key and slot surfaces, while beneficial when used for mandrels which employ platens, has benefit for mandrels which do not employ platens. The improvement in the surfaces in question results from having a slot bottom surface which is configured to provide a pair of longitudinal rails residing thereon, in combination with transverse slots on the bottom surfaces of the keys.

DETAILED DESCRIPTION OF THE PREFERRED EMBODIMENTS

Figure 5:
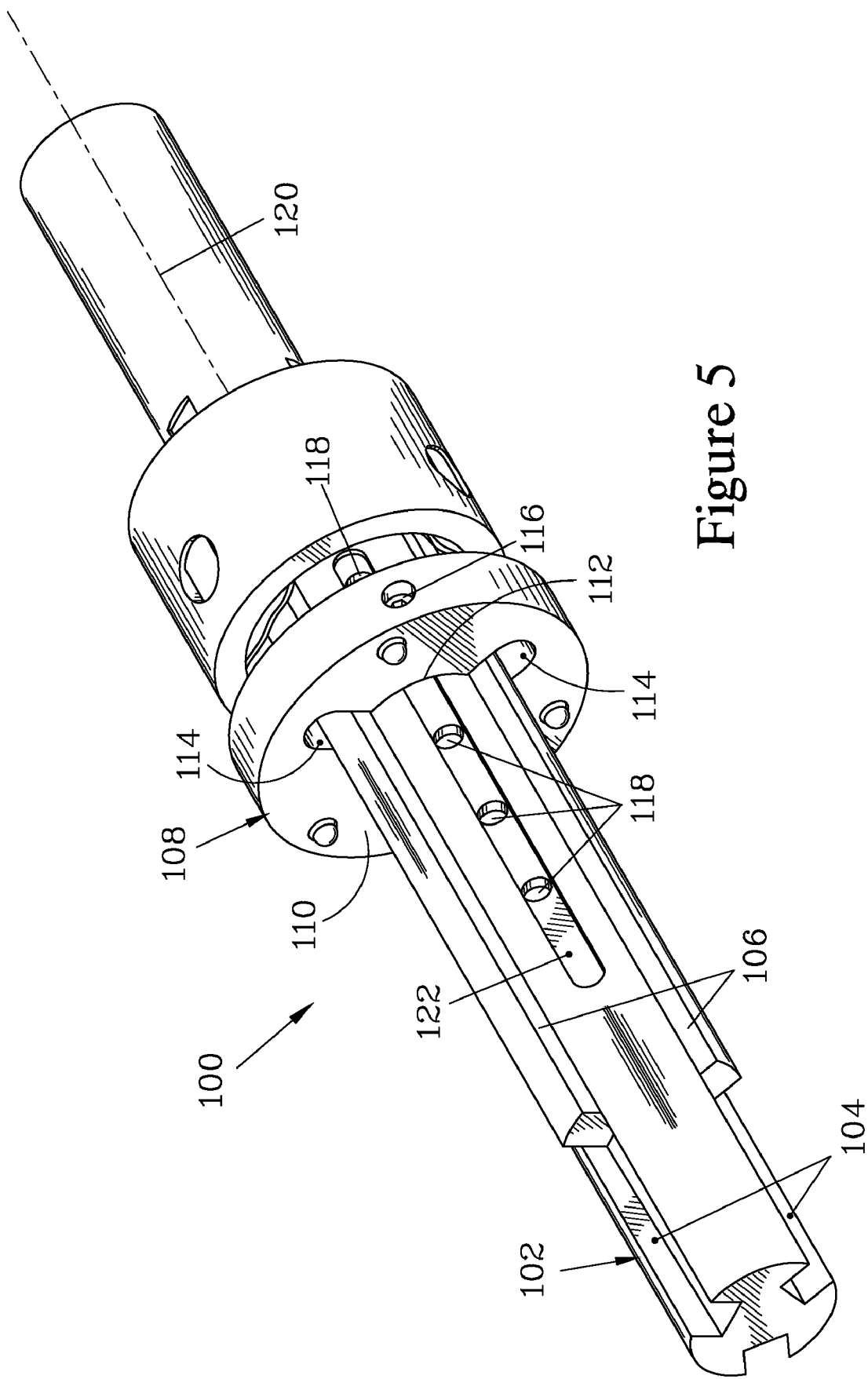
FIG. 5 is an isometric view of an embodiment which is similar to that shown in FIG. 1, but which employs a series of indexing holes along the shank of the mandrel to allow the set screw to fix the platen in a desired location along the shank.

FIG. 1 is an isometric view of an expanding mandrel 10 which is suitable for incorporating one or more of the improvements of the present invention. This expanding mandrel 10 has a shank 12 having a longitudinal shank axis 14. The shank 12 has a shank length L and terminates in a distal end 16 and a proximal end 18. The shank 12 is illustrated as being substantially cylindrical; however, frequently shanks have a frusto-conical section in the region adjacent to the distal end 16.

In either case, the shank 12 has a plurality of radial slots 20 (preferably 3, as shown) extending longitudinally therealong. The radial slots 20 are each bounded by a slot bottom surface 22 and a pair of spaced apart slot sidewalls 24. The radial slots 20 are positioned and initiate in a region spaced apart from the proximal end 18 of the shank 12 and proceed toward the distal end 16. In this embodiment, the radial slots 20 extend and pass through the distal end 16, and converge as they approach the distal end 16. With the radial slots 20 so configured, the slot bottom surfaces 22 converge as the slot is traversed. If the expandable mandrel 10 is to be used to mount a part (not shown) having a blind hole, it may be preferred for the slot bottom surfaces 22 to converge as the slots 20 approach the proximal end 18.

For each of the radial slots 20, there is a corresponding key 26 (only two of which are visible in FIG. 1) that is configured so that it can be slidably engaged with its corresponding radial slot 20. The keys 26 each have a pair of spaced apart sidewalls 28 which are configured so that they can slidably engage one of the pairs of spaced apart slot sidewalls 24. Each key 26 has a key bottom surface 30 which is configured such that it can slidably engage the slot bottom surface 22. Each of the keys 26 also has a key upper surface 32, having at least a portion of which that is generated by one or more line segments that are parallel to the shank axis 14 when the key bottom surface 30 is slidably engaged with the slot bottom surfaces 22. The key 26 is further bounded by a distal end approaching end 34 and a proximal end approaching end (not shown) that faces toward the proximal end 18.

A extension 36 is provided on each of the keys 26, the extension 36 having a extension axis 38. In the embodiment illustrated, the extension 36 extends from the key upper surface 32 of each of the keys 26 and is substantially spaced apart from the distal end approaching end 34. Each of the extensions 36 has an extension sidewall (not shown) that is generated by a line 40 which is moved about the extension axis 38 of each of the keys 26 while remaining parallel to the extension axis 38. The extension axis 38 in turn is both normal to and intersecting the shank axis 14 when the key 26 is slidably engaged in one of the slots 20.

A collar 42 is provided that is configured to slidably engage the shank 12 and further configure to extend over a portion of the keys 26. The collar 42 in turn has a series of collar passages 44, each of which is configured to slidably engage one of the extensions 36 when the keys 26 are seated in the radial slots 20. For this embodiment, the proximal approaching ends of the keys 26 reside under the collar 42. It should be noted that for other configurations for expandable mandrels, the keys may not partially reside under the collar. For such expanding mandrels, the key extensions can be positioned such that they face the shank and engage radially-outward facing collar passages that slidably engage the extensions.

For the expanding mandrel 10, leaf springs 46 are employed to maintain the keys 26 seated at all times in the radial slots 20. The leaf springs 46 are each associated with one of the keys 26, and are located between the collar 42 and the shank 12. To assure that the leaf springs 46 apply pressure at the same location along the keys 26, means for maintaining the leaf springs 46 at a set position from the extensions 36 are provided by a spring-retaining notch 48 in the collar 42 which is engaged by the ends of each of the leaf springs 46.

For the embodiment illustrated in FIG. 1, the improvement results from the incorporation of a platen 50 (shown by itself in FIG. 2) which serves as a stop that assures that when parts (not shown) having a passage therethrough or therein are locked in position by the keys 26, these parts are at a set distance $D_s$ from the proximal end 18 of the shank 12.

The platen 50 has a part-engaging surface 52 and a central passage 54 normal thereto. The part-engaging surface 52 is designed to mate with a reference surface of the part. As shown in FIG. 2, the central passage 54 of the platen 50 is bounded by a sidewall 56 contoured to slidably engage the shank 12 of the mandrel 10. Having the central passage 54 so configured will assure that the part-engaging surface 52 remains essentially normal to the shank axis 14, thereby avoiding compromising the axial alignment of the part as the part is engaged on the mandrel 10.

The platen 50 is provided with key passages 58 which extend radially from the central passage 54 and are configured such that the movement of the keys 26 will not be restricted by contact with the platen 50. It should be appreciated that, if the set distance Ds is to be fixed, which could be readily done if the key upper surfaces 32 are not stepped lengthwise so as accommodate a broader range of passage diameters in the parts, the rotational alignment and the longitudinal positioning of the platen 50 could be fixed by a set screw which engages an indexing hole on the shank. For greater flexibility in positioning the platen, a series of indexing holes could be provided, as discussed below in the description of FIG. 5. In principal, the platen could be permanently affixed to the shank, but the resulting mandrel could not be readily disassembled for cleaning or repair.

A platen set screw 60 is provided, which is threadably engaged in the platen 50 and positioned so as to be radially aligned with the shank axis 14 when the platen 50 is slidably engaged with the shank 12. By tightening the platen set screw 60 so that it forcibly engages the shank 12, the platen 50 can be readily affixed with respect to the shank 12. It is preferred to provide a longitudinal platen guide track 62 that is configured to accommodate the platen set screw 60, yet which is of sufficiently narrow width as to limit rotation of the platen 50 with respect to the shank 12 to an extent that the keys 26 will not engage the platen 50 as they are radially extended.

To maintain the ability to position a part against the part-engaging surface 52 when there are irregularities in a control surface of the part, a number of indexing nubs 64 are provided to allow adjustment for such irregularities. In the embodiment illustrated, three indexing nubs 64 are employed. The indexing nubs 64 are positioned such that they will be symmetrically disposed about the central shank axis 14 of the shank 12 and are at a constant radial separation therefrom. The indexing nubs 64 in turn are slidably engaged in sets 66 that are embedded in the part-engaging surface 52 of the platen 50. Springs (not shown) are provided in the sets 66 to resiliently support the indexing nubs 64 so that they are resiliently mounted with respect to part-engaging surface 52.

Having resiliently mounted indexing nubs 64 in the part-engaging surface 52 provides multiple benefits to the operation of the resulting expandable mandrel 10. First, it allows the platen 50 to index against a control surface on the part which has irregularities. It also avoids bounce back which might result from impact of the part with the platen 50 and might interfere with the ability of the keys 26 to grip the mounting passage of the part.

FIG. 3 is a view of an alternative platen 50' which can be employed in place of the platen 50 to provide greater flexibility in the configuration of control surfaces of parts which can be indexed by the part-engaging surface 52'. In the platen 50', the part-engaging surface 52' has three series of indexing nubs (64', 64", and 64'"). The indexing nubs (64', 64", and 64'") in each series are spaced at a common radial distance from the shank axis 14, this distance differing for each of the series. Thus, the indexing nubs 64' are each positioned at a common radial distance less than a reference radius r from the shank axis 14, while the indexing nubs 64" and the indexing nubs 64'" are at common radii that are greater than the reference radius r.

FIG. 4 is a partial sectioned view of a mandrel 10' which incorporates an improvement in the keys 26' and the radial slots 20'. This improvement has utility for expandable mandrels that are employed for machining applications where work is done in a wet environment. This improvement has utility for expandable mandrels with or without the use of a platen.

FIG. 4 is a section of the mandrel 10 having part of the shank 12' and two of the keys 26' cut away so as to reveal details of the structure of the slot bottom surfaces 22' of the slots 20' and the key bottom surfaces 30' (only one of which is visible) of the keys 26'; these surfaces (22', 30') have been reconfigured in the mandrel 10'. The improvement results from details of the character of some of the surfaces of the slots 20' and the keys 26'. In particular, the slot bottom surface 22' of each of the slots 20' has been reconfigured by providing a pair of rails 68, while the key bottom surface 30' of each the keys 26' has been reconfigured by providing a series of transverse channels 70. The rails 68 and the transverse channels 70 enhance performance of the resulting expandable mandrel 10 by allowing the removal of liquid from the bottom surfaces (22', 30') which are to be brought into contact by impact of the shank 12' on a surface. This serves to relieve any hydrostatic pressure which would impede the locking capability of the keys 26' against the slots 20'.

FIG. 5 is an isometric view of an expanding mandrel 100 which forms another embodiment of the present invention. The expanding mandrel 100 shares many features in common with the expanding mandrel 10 discussed above, having a shank 102 with a plurality of radial slots 104 that are each slidably engaged by a key 106, and having a platen 108 which can be affixed to the shank 102 to index the position of parts along the shank 102 when such parts are mounted onto the expandable mandrel 100. This embodiment differs in the means for fixing the platen 108 to the shank 102; the expandable mandrel 100 provides more positive fixing of the position of the platen 108.

The platen 108 again has a part-engaging surface 110, against which parts are indexed, a central passage 112 that slidably engages the shank 102, and a plurality of key passages 114 which accommodate movement of the keys 106. The platen 108 again has a platen set screw 116 that is threadably engaged therein and which is positioned to be radially advanced into engagement with the shank 102. The shank 102 in this embodiment is provided with a series of indexing holes 118 which reside in a line parallel to a longitudinal shank axis 120, each extending radially towards the shank axis 120. To secure the platen 108 in a desired position, the platen 108 is slid along the shank 102 until the platen set screw 116 is aligned with a desired one of the index holes 118. The platen set screw 116 is then turned, causing it to threadably advance with respect to the platen 108 so as to eventually extend into the selected indexing hole 118. The platen set screw is tightened until it forcibly engages the shank 102 to affix the position of the platen 108 along the shank 102.

Again, it is preferred to provide a longitudinal platen guide track 122 to limit rotation of the platen 108 with respect to the shank 102. The platen guide track 122 is configured to engage the platen set screw 116 when the platen set screw 116 is retracted out of one of the indexing holes 118, this engagement limiting rotation of the platen 108 to maintain the key passages 114 aligned so as to avoid interference with movement of the keys 106.

While the novel features of the present invention have been described in terms of particular embodiments and preferred applications, it should be appreciated by one skilled in the art that substitution of materials and modification of details obviously can be made without departing from the spirit of the invention.

What I claim is:

1. An improved expandable mandrel having, a shank terminating at a distal end and a proximal end, having a shank length (L) and having a longitudinal shank axis, the shank having, a plurality of radial slots extending longitudinally therein, each of the slots being bounded by a slot bottom surface and a pair of spaced-apart parallel slot sidewalls, the slots initiating in a spaced apart relationship from the proximal end and extending in the direction of the distal end of the shank, the slot bottom surface of each of the slots being inclined with respect to the shank axis such that the bottom surfaces converge as they traverse the shank, a plurality of keys slidably insertable into the radial slots, each of the keys being bounded by, a proximal end approaching key end, a distal end approaching key end, a pair of spaced-apart key sidewalls configured so as to slidably engage the pair of spaced-apart slot sidewalls, a key bottom surface configured so as to slidably engage the slot bottom surface, and a key upper surface having at least a portion which is generated by one or more line segments that each extend parallel to the shank axis when the key is engaged with one of the radial slots such that the slot bottom surface is slidably engaged with the key bottom surface, and each of the keys having an extension positioned in the vicinity of the proximal end approaching key end, a collar configured to slidably engage the shank and having a series of passages each configured and positioned to slidably engage one of the extensions when the keys are slidably engaged with the radial slots, spring means for maintaining the keys radially engaged with the radial slots, and means for maintaining the spring means at a set position from the extensions, the improvement comprising: a platen having, a part-engaging surface, and key passageways radially aligned with the shank axis and of sufficient size to accommodate the keys; means for affixing said platen longitudinally on the shank; and means for limiting rotational motion between said platen and the shank so as to avoid interference of the keys with said key passageways.

2. The expanding mandrel of claim 1 wherein said means for affixing said platen longitudinally on the shank and said means for limiting rotational motion between said platen and the shank are provided, in combination, by affixing said platen to the shank.

3. The expanding mandrel of claim 1 wherein said platen further comprises:
   a central passage of sufficient size to accommodate the shank, and
wherein the improvement further comprises:
   means for translating said platen along the shank axis.

4. The expanding mandrel of claim 3 wherein said means for translating said platen along the shank axis is provided by having said central passage configured to slidably engage the shank, further wherein said means for affixing said platen longitudinally on the shank and said means for limiting rotational motion, in combination, comprise:
   a platen set screw which can be tightened to fixably engage the shank.

5. The expanding mandrel of claim 4 wherein said means for affixing said platen longitudinally on the shank and said means limiting rotation motion, in combination, further comprise:
   at least one indexing hole on the shank extending normal to the shank axis and configured to accept a portion of said platen set screw,
      said at least one indexing hole being positioned on the shank such that, when engaged by said platen set screw, said platen is positioned such as to avoid interference of the keys with said key passageways.

6. The expanding mandrel of claim 5 wherein said at least one indexing hole further comprises:
   a series of indexing holes arranged on the shank in a line parallel to the shank axis.

7. The expanding mandrel of claim 4 wherein said means for affixing said platen longitudinally on the shank and said means limiting rotation motion, in combination, further comprise:
   a longitudinal platen guide track in the shank, said platen guide track being configured so as to guidably engage said platen set screw.

8. The expanding mandrel of claim 7 wherein said means for affixing said platen longitudinally on the shank and said means limiting rotation motion, in combination, further comprise:
   a series of indexing holes arranged on the shank in a line parallel to the shank axis and located within said longitudinal platen guide track, each of said indexing holes extending normal to the shank axis and being configured to accept a portion of said platen set screw.

9. The expanding mandrel of claim 1 further comprising:
   indexing nubs resiliently mounted to said part-engaging surface of said platen.

10. The expanding mandrel of claim 9 wherein said indexing nubs further comprise: a first set of indexing nubs located at a radial distance less than a reference radius r from the shank axis; and a second set of indexing nubs located at a radial distance greater than reference radius r from the shank axis.

11. The improved expanded mandrel of claim 1 wherein the improvement further comprises:
   a pair of longitudinal rails on the slot bottom surface of each of the radial slots; and
   a series of transverse grooves on the key bottom surface of each of the keys.

* * * * *